June 30, 1942.　　A. F. KUESTER　　2,288,246
WHEEL MOUNTING
Filed Oct. 3, 1940　　2 Sheets-Sheet 2
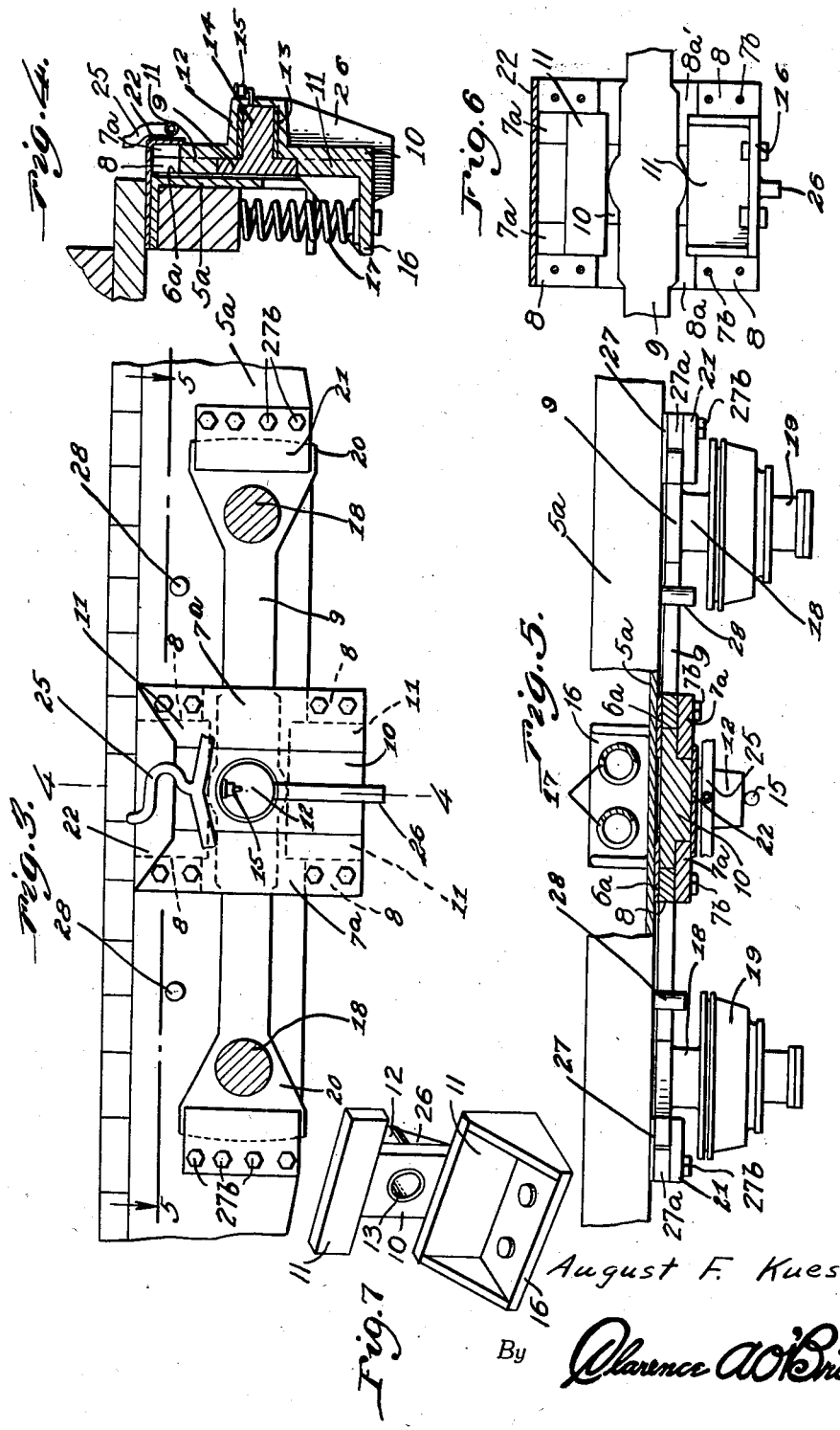
Inventor
August F. Kuester
By Clarence A. O'Brien
Attorney Patented June 30, 1942

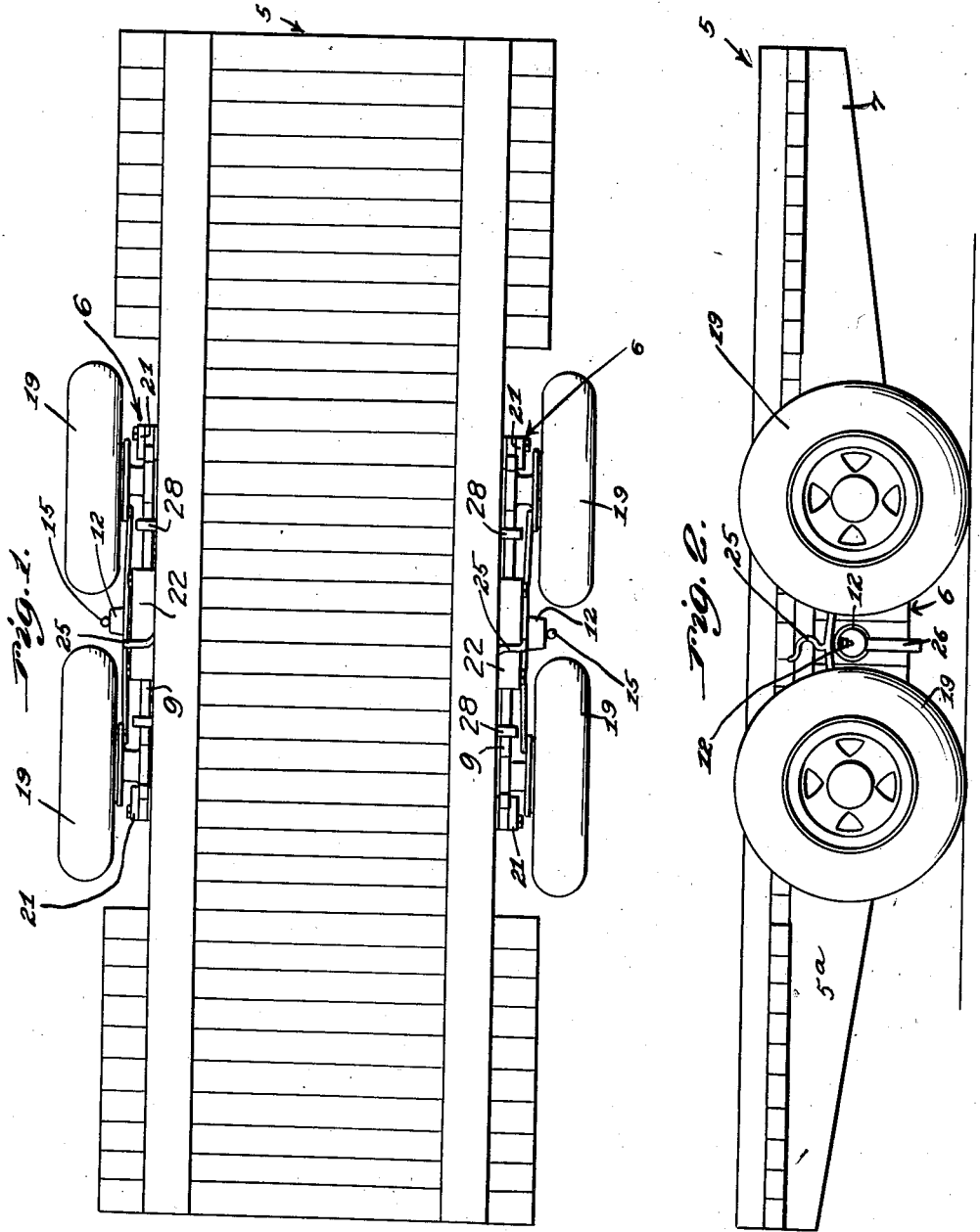

2,288,246

UNITED STATES PATENT OFFICE 2,288,246

WHEEL MOUNTING

August F. Kuester, Clintonville, Wis.

Application October 3, 1940, Serial No. 359,589

2 Claims. (Cl. 280—124)

This invention relates to wheel mountings for trailers and similar vehicles and especially for trailers designed for extremely heavy loads and for high speed and of the tilting type.

The primary object of this invention is the provision of mountings which will provide for low center of gravity to the trailer with the wheels on each side thereof arranged in tandem fashion and located substantially intermediate the ends of the trailer frame, with means whereby each wheel of the pairs of wheels will be free to move vertically relative to the other wheels when encountering uneven surfaces and be checked from any lateral movement with respect to the side of the trailer, the body frame and load of said trailer being cushioned against road shocks by the wheel mountings.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a tiltable type trailer equipped with wheel mountings constructed in accordance with my invention.

Figure 2 is a side elevation illustrating the same.

Figure 3 is a fragmentary side elevation partly in section illustrating a wheel mounting with the wheels removed and showing its application to the frame of the trailer.

Figure 4 is a fragmentary transverse sectional view taken on the line 4—4 of Figure 3.

Figure 5 is a fragmentary top plan view, taken partly in section on the line 5—5 of Figure 3 and showing the cushioning means for the wheel mounting on the trailer frame.

Figure 6 is a view in rear elevation showing the wear plates, spacer blocks and the pivot table also the walking beam and the cushion spring seat carried by the pivot plate.

Figure 7 is a view in perspective of the plate and spring seat.

Referring in detail to the drawings, the numeral 5 indicates a trailer especially designed for heavy loads and is of the tiltable type including side frame beams as at 5a. In order that the trailer be substantially supported on the roadway a pair of wheel mountings 6 are provided therefor and form the subject matter of the present invention. It is to be noted that the wheel mountings are so located with respect to the ends of the trailer frame, designated by the character 7, that the trailer can tilt forwardly or rearwardly as desired for loading and unloading purposes. As each of the wheel mountings is identical in construction, reference specifically to one is thought sufficient.

Describing now one of the wheel mountings 6, said mounting comprises a pair of elongated guide plates 7a opposed flatwise to the outer face of one of the side beams 5a in upright position and spaced apart with inner edges confronting. The guide plates 7a are spaced from said one side beam by a pair of relatively thinner wear plates 6a opposed flatwise against said outer face of the side beam 5a behind guide plates 7a, and by upper and lower pairs of spacer blocks 8 arranged intermediate the wear plates 6a and guide plates 7a behind the upper and lower ends of the latter and offset in each pair in a separative direction from the confronting edges of said guide plates 7a for a purpose presently seen. Bolts 7b secure the plates 7a, 6a and the blocks 8 to said side beams 5a. The wear plates 6a, guide plates 7a and spacer blocks 8 form horizontal guideways 8a intermediate the ends of the plates 6a, 7a.

A pivot plate 10 is flush with the outer faces of the vertical guide plates 7a and is slidable therebetween and held against displacement when subjected to any strains tending to tilt said pivot plate. Cast on the rear face of the pivot plate 10 and projecting beyond opposite edges thereof is a pair of upper and lower guide members 11 which slidably engage the rear faces of the guide plates 7a and the spacer blocks 8, also the wear plates 6a and provide a space therebetween for the accommodation of the walking beam 9.

An offset 12 is integral with the pivot plate 10 and forms a mounting for a sleeve type journal 13 to rotatably receive a trunnion 14 formed integrally with the walking beam 9 and located intermediate the ends of the latter. Suitable lubrication means 15 is carried by the offset 12 for furnishing lubrication to the trunnion and the sleeve journal 13.

A spring seat 16 is integral with the lower end of the pivot plate 10 and extends at right angles thereto and on which are mounted coil type cushioning springs 17 which are engageable with the frame of the vehicle or a member carried thereby as clearly shown in Figure 4. The springs 17 act to cushion the frame and load thereon against road shocks.

Axles 18 are formed on the walking beam adjacent the ends thereof on which vehicle wheels 19 of a conventional construction are journaled. Thus it will be seen that the wheels are arranged in tandem relation and are capable of moving vertically independently of each other due to the pivot of the walking beam and the cushion mounting of the walking beam on the frame of the vehicle.

It is preferable that the free ends of the walking beam be flared edgewise to enlarge the same, as shown at 20, and that said ends 20 are arranged to play behind vertically arranged guide plates 21 secured on the outer faces of the side beams 5a of the trailer. The guide plates 21 act to prevent any tendency of the ends of the walking beam to swing laterally towards or from the side face of the side beams 5a, consequently maintaining the wheels in perfect alignment one behind the other under all conditions.

The flared ends 20 of the walking beam which contact the guide plates 21 may be lubricated in any suitable way and arranged at the upper ends of the guide plates 7a are shield plates 22 suitably secured on the vehicle frame. The character 25 merely indicates the fluid tubes of a hydraulic brake system for the brakes of the wheels.

A reinforcing web 26 may be formed integrally with the outer face of the pivot plate 10 and the offset 12 thereof.

Wear plates 27 are arranged between the side beams 5a and the guide plates 21 and engage the ends 20 of the walking beam. Also spacer blocks 27a are interposed between the guide plates 21 and the wear plates 27. Stops 28 are arranged on the trailer frame to prevent excessive pivotal movement of the walking beam should a tire of any one of the wheels become deflated. Bolts 27b secure the guide plates 21, wear plates 27 and spacer blocks 27a to the side beams 5a.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a wheel mounting for a vehicle, a frame side beam, a pair of vertically disposed guide plates fixed to the outer face of said beam and having inner edges spaced apart and parallel and also spaced from said face, means spacing said plates from said face and forming together with said plates horizontal guideways between the ends of the plates, a pivot plate fitting between said edges of the pair of plates for vertical sliding movement and having upper and lower spaced guides fitting behind said edges of said plates to prevent outward movement of said pivot plate, said guides spacing said pivot plate from the outer face of said beam, spring means cushioning upward movement of the pivot plate, a walking beam pivoted intermediate its ends on said pivot plate behind the same for vertical oscillation in said space and in said horizontal guideways, and a pair of ground wheels journaled on opposite ends of said walking beam respectively.

2. In a wheel mounting for a vehicle, a frame side beam, a pair of vertically disposed guide plates fixed to the outer face of said beam and having inner edges spaced apart and parallel and also spaced from said face, means spacing said plates from said face and forming together with said plates horizontal guideways between the ends of the plates, a pivot plate fitting between said edges of the pair of plates for vertical sliding movement and having upper and lower spaced guides fitting behind said edges of said plates to prevent outward movement of said pivot plate, said guides spacing said pivot plate from the outer face of said beam, spring means cushioning upward movement of the pivot plate, a walking beam pivoted intermediate its ends on said pivot plate behind the same for vertical oscillation in said space and in said horizontal guideways, a pair of ground wheels journaled on opposite ends of said walking beam respectively, and a pair of stabilizing plates on said side beam overlapping the outer ends of the walking beam to prevent lateral play of said ends, said ends of the walking beam being enlarged and flattened to provide adequate bearing surfaces engaging said stabilizing plates.

AUGUST F. KUESTER.